Patented June 15, 1943

2,321,979

UNITED STATES PATENT OFFICE 2,321,979

TERPENE DERIVATIVE

Joseph N. Borglin, Wilmington, Del., assignor to Hercules Powder Company, Wilmington, Del., a corporation of Delaware No Drawing. Application April 9, 1941, Serial No. 387,676

10 Claims. (Cl. 260—611)

This invention relates to new terpene compounds and a method for their formation. More particularly, it refers to new hydroxyl-containing terpene ethers and to a method for their preparation from terpinolene.

In accordance with this invention the terpene hydrocarbon or terpene fraction boiling within the range between about 185° C. and 195° C. and having a specific gravity between about 0.863 and about 0.873 at $$\frac{15.6° \text{ C.}}{15.6° \text{ C.}}$$

is brought into intimate contact with oxygen and with an alcohol and reacted therewith until a hydroxyl-containing terpene ether is formed. This reaction may be conducted under pressure if desired, and it may be facilitated by the aid of catalysts if desired. By the reaction in accordance with this invention, there is formed a mixture of oily water-insoluble hydroxyl-containing terpene ethers and water-soluble hydroxyl-containing terpene ethers. Both products are characterized by ether linkages and by hydroxyl groups upon both secondary and tertiary carbon atoms of the terpenic portion of the molecule. The two types of product mentioned may be separated and recovered from the reaction mixture.

The terpene hydrocarbon or terpene fraction reacted with alcohol and oxygen in the method in accordance with this invention will boil within the range of about 185° C. to about 195° C. at 760 mm. pressure, and has a specific gravity within the range of about 0.863 to about $$0.873 \left( \frac{15.6° \text{ C.}}{15.6° \text{ C.}} \right)$$

and preferably will boil within the range of about 187° C. to about 191° C., and have a specific gravity within the range of about 0.865 to about $$0.870 \left( \frac{15.6° \text{ C.}}{15.6° \text{ C.}} \right)$$

It is believed to be terpinolene, although this identification is not positive, due to conflicting physical constants given for terpinolene in the literature. Hereinafter, when the term terpinolene is used, it will be understood that a terpene hydrocarbon having a boiling range of about 185° C. to about 195° C. and a specific gravity within the range of about 0.863 to about $$0.873 \left( \frac{15.6° \text{ C.}}{15.6° \text{ C.}} \right)$$

is meant.

Terpinolene or mixtures rich in terpinolene may be used in the method in accordance with this invention. Various commercially available terpene "cuts" may be used, although it will be understood that the closer the boiling range of the "cut" is to the preferred range of 187° C. to 191° C., which represents terpinolene of fairly high purity, the more efficient in speed and yield the reaction will be. A terpene fraction boiling in the range of about 185° C. to about 195° C., and having a specific gravity within the range of 0.863 to 0.873, secured in the refining of crude wood turpentine or isomerized turpentine, is satisfactory for the purpose. Likewise, a terpene mixture secured as a by-product of the manufacture of camphor, and sold under the trade name of "Terpene B" may be used, constituents boiling between 185° C. and 195° C. representing the reactive portion. A fraction of "Terpene B" boiling near 188° C. is reacted in maximum yield to hydroxy ethers and especially water-soluble hydroxy ethers by the process in accordance with this invention. Likewise, substantially pure alpha-terpineol may be dehydrated with sodium acid sulfate and the resultant product fractionated to separate a cut with a boiling range of 187° C. to 191° C., which is particularly suitable for reaction in accordance with this invention. Other terpenes may be present but they reduce yield and slow the reaction; the terpinolene should comprise in excess of 40% of the terpene cut used.

Another example of a terpene fraction which is highly suitable in the process in accordance with this invention, a fraction separated from crude wood turpentine having the following characteristics may be cited:

*A. S. T. M. distillation range*

| | |
|---|---|
| 1st drop | °C__ 186.0 |
| 5% | °C__ 187.0 |
| 10 | °C__ 187.3 |
| 20 | °C__ 187.5 |
| 40 | °C__ 187.5 |
| 50 | °C__ 187.6 |
| 60 | °C__ 188.0 |
| 70 | °C__ 188.2 |
| 80 | °C__ 188.6 |
| 90 | °C__ 189.0 |
| 95 | °C__ 190.0 |
| Specific gravity | 0.8702 |
| Refractive index | 1.4857 |
| Specific rotation | +0.6 |

The alcohol which is utilized in the method according to this invention may be aliphatic (i. e., alkyl or cycloalkyl in nature with or without substituents or ethylenic linkages), heterocyclic, aromatic (i. e., substituted or unsubstituted aryl, alkaryl, aralkyl alcohols). Compounds containing phenolic hydroxyl are considered as alcohols in the reaction according to this invention. Suitable alcohols are, for example, methanol, ethanol, propanol, isopropanol, butanol, isobutanol, amyl alcohol, beta-chloro ethanol, beta-ethyl ethanol, beta-methyl ethanol, allyl alcohol, cyclohexanol, furfuryl alcohol, tetrahydrofurfuryl alcohol, ethylene glycol, glycerol, erythritol, sorbitol, benzyl alcohol, phenol, ortho-cresol, meta-cresol, para-cresol, xylenol, triethanolamine, diethanolamine, monoethanolamine, trimethylolnitromethane, nitropropanol, aminopropanol, and the like.

The oxygen utilized in the reaction according to this invention may be provided in the form of any gas containing free oxygen. Pure oxygen may be utilized, if desired. However, oxygen is most conveniently provided in the ordinary atmospheric form.

The reaction in accordance with this invention is brought about by mixing the terpinolene and the alcohol utilized and bringing this mixture into intimate contact with oxygen. This may be accomplished by vigorous agitation of the liquid reactants to provide a constant renewal of surface exposed to the oxygen. Preferably, air or oxygen is whipped up into the liquid or is bubbled through the liquid reactants. The reaction is facilitated by providing the oxygen under superatmospheric pressure. Thus, air at any convenient pressure may supply the oxygen, the speed of the reaction increasing as the pressure is increased. Pressures up to several thousand atmospheres may be utilized, the actual pressure being dictated largely by convenience.

The reaction may be conducted at any temperature in the range between about 0° C. and about 200° C., or between 0° C. and 100° C. where water-soluble products are desired. Preferably the temperature will be maintained between about 15° C. and about 60° C. as only in this range are good yields of water-soluble products obtained in a reasonable time. The reaction with terpinolene is exothermic. Thus, where oxygen is provided under conditions promoting rapid reaction, the temperature of the reaction mixture may rise rapidly. It is usually desirable to provide external cooling in such cases to control the temperature in the desired range.

The time required to form hydroxyl-containing terpene ethers by the method in accordance with this invention varies considerably with the conditions of reaction utilized. The conditions of oxygen contact largely determine the minimum time of reaction. Where the liquid reactants are merely agitated in air, or where air is slowly bubbled through a large mass of liquid reactants, the time required for substantially complete reaction will usually be long, and may be from half a day to, say, 20 days. The time will be reduced as agitation is increased, and in the case of reactions under high oxygen pressures, the reaction time may be as short as from, say, about 0.5 to about 6 hours.

Usually, the reaction mixture will consist essentially of the terpinolene and the alcohol (which may be aqueous) reacted with the alcohol in excess of that expected to enter into the reaction. However, inert diluents such as benzene, toluene, acetone, methylethyl ketone, ethyl acetate, petroleum ether and the like may be present.

It is within the scope of this invention to conduct the oxidation-etherification reaction either in the substantial absence or in the presence of water. Where water is present during the reaction, the proportion of water-soluble product and the hydroxyl content of the total product tend to be increased. Water may be present in a quantity of, say, three times the quantity of the alcohol utilized on a molecular basis or more may be used. However, large quantities of water reduce the content of ether linkages obtained in the product and tend to slow down the reaction due to decreased miscibility with the terpinolene. Hence, where water is utilized, the quantity will preferably be in the range between a minor quantity such as 5% of the alcohol up to about one-half the quantity of the alcohol, by molecular proportion.

The reaction may be facilitated, if desired, by the use of catalysts. Oxidation or oxygen carrier catalysts which operate by reason of active surfaces such as activated carbon, flake aluminum, activated alumina, and the like; or which contain elements which readily undergo reversible changes in valence such as, for example, potassium permanganate, selenium oxide, cerium sulphate, vanadium sulphate, cobalt naphthanate, manganese linoleate, lead naphthanate, lead linoleate, and the like; or hydrohalides of basic nitrogen compounds (hydrohalides of ammonia or amines), for example, ammonium chloride, ammonium bromide, aniline hydrochloride, pyridine hydrochloride, triethanolamine hydrochloride, methylamine hydrochloride, and the like may be used. Such catalysts may be utilized under any of the conditions of reaction previously mentioned.

The reaction in accordance with this invention will usually be conducted until substantially no more oxygen is absorbed by the reacting mixture. Operation may be by batch or, where conditions giving fairly rapid reactions are used, operation may be continuous. The reaction product will be a mixture containing hydroxy terpene ethers of an oily nature insoluble in water and hydroxy terpene ethers of a water-soluble nature. These products may be recovered from the reaction mixture by stirring in water, if little or none is present, and separating the two layers which form. The water-soluble products may be recovered as a viscous syrupy liquid from the water layer by careful evaporation of the water and associated alcohol at a reduced pressure and at as low as possible a temperature. The water-insoluble products may be recovered from the oily layer in a similar manner by vacuum evaporation of volatile materials. The most highly hydroxylated material is the least volatile.

The syrupy water-soluble product may be resolved in most cases into a white crystalline solid and a non-crystalline fraction by permitting it to stand for some weeks at 0–40° C. and separating the resulting crystals from the liquid. The more reactive alcohols such as methyl, ethyl, etc., phenol, etc., give the greatest yield of crystalline hydroxy ether.

The water-soluble product and the water-insoluble product obtained by the method in accordance with this invention are terpene ethers of the alcohol utilized, having a hydroxyl upon the terpenic portion of the molecules. It is a characteristic of the compounds that they contain a hydroxyl upon a tertiary carbon atom of the terpenic structure, and in addition they will usually contain a hydroxyl upon a secondary carbon atom of the terpenic structure. The water-soluble product, in general, has a higher hydroxyl content than the water-insoluble product. Both products are believed to consist of a mixture of rather similar compounds which differ from each other in part by degree of oxidation and etherification and in part by isomerization. It is believed that the addition of hydroxyl groups and ether groups such as the alkoxyl, aryloxyl, etc., groups is not entirely uniform, so that several isomers may be obtained varying in position to the added groups.

The products in accordance with this invention may be modified by heating them in the presence of an acid, especially a strong inorganic acid, such as sulphuric acid, sodium acid sulphate, phosphoric acid, nitric acid, hydrochloric acid, etc., or in the presence of dehydrating surface active agents such as, activated silica gel, activated alumina, and the like, whereupon products of reduced hydroxyl content are obtained by chemical dehydration. In this manner, hydroxyl groups may be removed from the water-soluble hydroxylated ethers to form water-insoluble ethers.

The exact mechanism of the reaction according to this invention is not known. Analysis shows the presence of ether linkages and of tertiary alcohol linkages on the terpenic portion of the product, and usually hydroxyls on secondary carbons are found. The reactions involve increase in the molecular weight of the terpinolene, and are, therefore, of the nature of addition reactions. No appreciable scission of the terpinolene or cracking takes place, although isomerization and/or decyclicization of the terpenic structure may occur. It is believed the following equations express the nature of the reactions which occur when terpinolene is reacted with oxygen and, for example, ethyl alcohol.

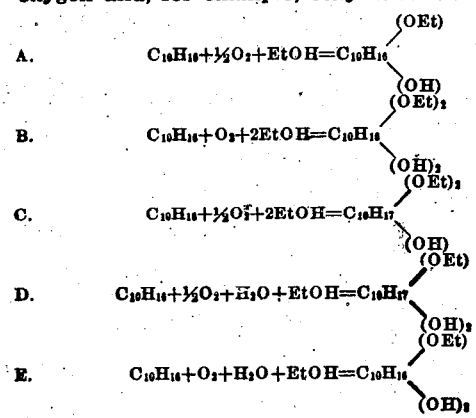

The process and product in accordance with this invention are illustrated by specific embodiments thereof in the following examples.

*Example 1*

A mixture of 1,500 cc. of methanol and 1,500 cc. of terpinolene (boiling range 186° C. to 194° C.) was stirred for 252 hours while a slow stream of air was passed through the mixture. An exothermic reaction took place, causing the temperature of the mixture to rise from an initial 28° C. to 35° C. At the end of the reaction period, 700 cc. of water were added, and the resulting mixture was well shaken. The diluted reaction mixture was permitted to separate into two layers, which were separated by decantation. In this manner, 2,260 cc. of an aqueous phase and 1,425 cc. of an oily phase were obtained. Water was removed from the aqueous layer by evaporation under a high vacuum. In this manner, 59 grams of a pale yellow liquid terpene hydroxy ether soluble in water was obtained.

*Example 2*

A mixture of 1,000 cc. of a terpinolene cut (boiling range 180° C. to 190° C.) and 2,000 cc. of 95% ethyl alcohol was mechanically stirred for 341 hours while a slow stream of air was passed through the mixture. An exothermic reaction took place, raising the temperature of the mixture from an initial 28° C. to 35° C. The resulting reaction mixture was placed in a separatory funnel, and permitted to separate into two layers. In this manner, an oily layer having a volume of 780 cc. and an alcohol solution having a volume of 2,005 cc. were obtained. The alcohol solution was evaporated under high vacuum and at a relatively low temperature. In this manner, 396 grams of water-soluble terpene hydroxy-containing ethers were recovered. The material was a light-colored, viscous liquid which analyzed as follows:

| | |
|---|---|
| Saponification number | 55.0 |
| Secondary alcohol per cent | 25.0 |
| Tertiary alcohol do | 127.0 |
| Ethoxyl ($-OC_2H_5$) do | 11.75 |

The alcohol contents were obtained by calculating hydroxyl content on the basis of a $C_{10}H_{17}OH$ monohydric terpene alcohol. Thus, the figure shows that a tertiary hydroxyl content averaging more than one hydroxyl per molecule was attained in addition to the secondary hydroxyl. The analysis shows that the product consists of a mixture of hydroxy terpene ethers wherein the hydroxyl groups are secondary and tertiary in nature. A portion of the water-soluble liquid product was permitted to stand for a month at 20° C. a white crystalline product was recovered by centrifuging from the syrupy liquid.

The oily layer recovered in the foregoing oxidation etherification reaction was fractionated in vacuo (10 cm. pressure) into two fractions of distillate coming over between 50° C. and 100° C., and a distillation residue. These fractions gave these following analyses:

| | Fraction No. 1 | Fraction No. 2 | Distillation residue |
|---|---|---|---|
| Saponification number | 2.0 | 5.0 | 48 |
| Secondary alcohol | 3.5% | 6.1% | 20% |
| Tertiary alcohol | 8.1% | 9.1% | 52.5% |
| Volume | 100 cc. | 175 cc. | 239.6 g. |

It will be noted that the two fractions of distillate represent products reacted to a considerably less extent, and, therefore, of lower molecular weight than the residue which was not distilled over.

*Example 3*

A slow stream of air was bubbled through an agitated reaction mixture consisting of 2,000 cc. of terpinolene (boiling range 182° C. to 196° C.), 950 cc. of water, and 150 cc. of triethanolamine for a period of 329 hours with the reaction mixture at a temperature of 30–35° C. At the end of the reaction period, agitation was discontinued, and the reaction mixture was permitted to separate into two layers. The aqueous layer (1,100 cc.) was evaporated in vacuo and at low temperature to give 934 grams of water-soluble terpene hydric amino ethers having the following analyses:

| | |
|---|---|
| Nitrogen combined per cent | 1.13 |
| Hydroxyl content do | 7.8 |
| Free triethanolamine do | 0 |

The oily layer consisted of unreacted terpenes and triethanolamine ethers of low hydroxyl content.

Example 4

A slow stream of air was bubbled through an agitated mixture consisting of 2,000 cc. of terpinolene (boiling range 182° C. to 191° C.) and 200 grams of phenol for a period of 329 hours at a temperature of 28 to 35° C. At the end of the reaction period, 1,000 cc. of water were added and the mixture was shaken well. Two layers were then permitted to form, 1,100 cc. of an aqueous layer being obtained. Upon evaporation to remove water from the aqueous layer at low temperature and in vacuo, 710 grams of water-soluble terpene hydric phenyl ether were obtained. This product was free from phenol. Partial crystallization to form white crystals occurred upon three weeks standing at 20° C.

The oily layer (1,960 cc.) was steam distilled to obtain 710 grams of distillate and 1,127 grams of distillation residue. The steam distillation residue analyzed as follows:

Average molecular weight (Rast method) _____ 196

Specific gravity $\frac{15.6°C}{15.6°C}$ _____ 1.0741

$n^{20}_D$ _____ 1.5275

Hydroxyl content (Zerewitinoff method) _____ per cent __ 12.1

A. S. T. M. boiling range (760 mm.):

| Per cent distilled | Temperature |
|---|---|
| | °C. |
| 5% | 164.5 |
| 10 | 167.8 |
| 20 | 174.5 |
| 30 | 186.0 |
| 40 | 194.5 |
| 50 | 208.0 |
| 60 | 224.5 |
| 70 | 249.5 |
| 80 | 315.5 |
| 90 | 326.5 |
| 95 | 331.5 |

This product consisted of a mixture of phenyl ethers of low hydroxyl content and unreacted terpenes.

Example 5

A slow stream of air was bubbled through an agitated mixture consisting of 1,500 cc. of terpinolene (boiling range 186° C. to 189° C.) and 1,500 cc. of methanol for a period of 252 hours. At the end of this period, 1,650 cc. of water were added and the mixture was shaken well. Two layers were then permitted to form, and these were separated by decantation. The aqueous layer which consisted of 3,500 cc. was evaporated at low temperature and in vacuo to remove water. In this manner, 562 grams of terpene hydric methyl ether were obtained. The product analyzed as follows:

Hydroxyl (Zerewitinoff method) __percent__ 13.5
Methoxyl content _____do____ 17.8

White crystals formed in this product upon standing for a month.

The oily layer which consisted of 1,013 cc. was steam distilled under reduced pressure, whereby 525 cc. of distillate and 412 grams of a distillation residue were obtained. These products analyzed as follows:

| | Distillate | Residue |
|---|---|---|
| Quantity | 525 cc. | 412 g. |
| Methoxyl | 1.5% | 12.5% |
| $n^{20}_D$ | 1.4703 | 1.4935 |
| Hydroxyl (Zerewitinoff) | 1.25% | 8.75 |

Example 6

A slow stream of air was bubbled through an agitated mixture consisting of 1,500 cc. of terpinolene and 1,500 of 95% ethyl alcohol for a period of 252 hours. The reaction mass was then diluted with water, and two resulting layers separated by decantation. The aqueous alcohol layer was subjected to evaporation, and in this manner gave 437 grams of water-soluble terpene hydric ethyl ether which had an ethoxyl content of 8.18%.

The oily layer was steam distilled to give a distillate of 575 cc. and a distillation residue of 470 grams, the latter material having an ethoxyl content of 10.2%.

Example 7

A mixture consisting of 500 cc. of terpinolene, 500 cc. of methanol, and 2.5 grams of activated carbon (Darco) was placed in an autoclave, and the autoclave charged with air at a gauge pressure of 1,500 pounds per square inch. The autoclave was then vigorously shaken and maintained at a temperature of 35° C. for 5½ hours. The resulting product was removed from the autoclave, and filtered to remove the activated carbon. The filtrate was then diluted with water and the two layers which formed were separated by decantation. Evaporation of the aqueous alcohol layer in vacuo at low temperature gave 122 grams of water-soluble terpene hydric ether. This product partially crystallized upon standing for 3 weeks at 20° C.

Example 8

A mixture consisting of 500 cc. of terpinolene and 500 cc. methanol was charged into an autoclave, and the autoclave charged with air at a gauge pressure of 1,200 pounds per square inch. The autoclave was vigorously shaken for 6 hours and maintained at a temperature of 50° C. during this period. The resulting product was then removed from the autoclave, diluted with water, and the two layers which formed were separated by decantation. The aqueous alcohol layer was evaporated in vacuo and at low temperature to obtain the water-soluble terpene hydric ether.

Example 9

A mixture consisting of 500 cc. of terpinolene, 500 cc. of methanol, and 2.5 grams of flake aluminum was charged into an autoclave with air at a gauge pressure of 1,000 pounds per square inch. The autoclave was then vigorously shaken for 5½ hours at a temperature of 54–70° C. The resulting reaction product was removed from the autoclave and diluted with water. The two liquid layers which formed were separated by decantation. The aqueous alcohol layer was subjected to evaporation in vacuo at a low temperature to yield 132 grams of water-soluble terpene hydric methyl ether. Partial crystallization of this product after three weeks standing at 20° C. gave a white crystalline hydric methyl ether.

Example 10

A mixture consisting of 500 cc. of methanol, 500 cc. of terpinolene, and 2.5 grams of ammonium chloride was charged into an autoclave with air at a gauge pressure of 1,000 pounds per square inch. The autoclave was vigorously shaken for 5½ hours at a temperature of 50–65° C. The resulting product was removed from the autoclave, diluted with water and the two layers which formed were separated by decantation. The aqueous alcohol layer was subjected to evaporation in vacuo at a relatively low temperature, whereby 146 grams of water-soluble terpene hydric ether were obtained.

The water-soluble products and the mixture of water-soluble and water-insoluble products made according to this invention are useful as solvents, furnishing excellent coupling agents between water-soluble and water-insoluble material of an organic nature. The water-insoluble products are useful as solvents in paints and cellulosic lacquers. The products also find use as a detergent aid and in flotation. They may be included in insecticides to improve the activity of toxic agents and to permit the inclusion of toxic agents of low water-solubility in aqueous insecticides.

Tertiary alcohol content as used herein is determined by dehydration under the influence of sodium acid sulphate as a catalyst, measuring the water and any alcohol evolved as indicative of tertiary hydroxyl. Secondary alcohol content is determined by acetylation of the dehydrated residue from the tertiary alcohol determination, followed by saponification, then determining the saponification number in the usual manner and calculating the secondary alcohol content therefrom. Results expressed as alcohol content are calculated on the monohydric alcohol basis assuming the formula $C_{10}H_{17}OH$.

It will be understood that the details and examples hereinbefore set forth are illustrative only, and that the invention as broadly described and claimed is in no way limited thereby.

What I claim and desire to protect by Letters Patent is:

1. A method which comprises subjecting a mixture comprising terpinolene and an alcohol to reaction with a gas containing free oxygen as sole reactive ingredient until a hydroxylated terpene ether is produced and recovering the resulting product.

2. A method which comprises reacting a mixture containing terpinolene and an alcohol with free oxygen, the free oxygen being contained as sole reactive ingredient in a gas under superatmospheric pressure, until a hydroxylated terpene ether is produced and recovering the resulting product.

3. A method which comprises subjecting a mixture comprising terpinolene, an alcohol, and an oxidation catalyst to reaction with a gas containing free oxygen as sole reactive ingredient until a hydroxylated terpene ether is produced and recovering the resulting product.

4. A method which comprises subjecting a mixture comprising terpinolene, an alcohol, and water to reaction with a gas containing free oxygen as sole reactive ingredient until a hydroxylated terpene ether is produced and recovering the resulting product.

5. A method which comprises subjecting a mixture comprising terpinolene, an alcohol, and water to reaction with air under superatmospheric pressure in the presence of an oxidation catalyst until a water-soluble hydroxylated terpene ether is produced, and recovering the said water-soluble hydroxylated terpene ether.

6. A method which comprises subjecting a mixture comprising terpinolene and an alcohol to reaction with oxygen in the free gaseous form at temperatures between about 0° C. and about 100° C. until a freely water-soluble terpene hydroxy ether is formed, and recovering the said ether.

7. Water-soluble hydroxylated terpene ethers formed by reaction of terpinolene with oxygen and an alcohol, the ethers being characterized by at least one tertiary terpene hydroxyl, by the property of losing hydroxyl on heating with sulfuric acid, and by being capable of concentration to a syrup which upon standing deposits colorless crystals of terpene hydroxy ether, said hydroxylated terpene ethers being prepared by the method defined in claim 1.

8. Water-soluble hydroxylated methyl terpene ethers formed by reaction of terpinolene with oxygen and methyl alcohol, the ethers being characterized by at least one tertiary terpene hydroxyl, by the property of losing hydroxyl on heating with sulfuric acid, and by being capable of concentration to a syrup which upon standing deposits colorless crystals of terpene hydroxy ether, said hydroxylated terpene ethers being prepared by the method defined in claim 1 with methyl alcohol as the alcohol.

9. Water-soluble hydroxylated ethyl terpene ethers formed by reaction of terpinolene with oxygen and ethyl alcohol, the ethers being characterized by at least one tertiary terpene hydroxyl, by the property of losing hydroxyl on heating with sulfuric acid, and by being capable of concentration to a syrup which upon standing deposits colorless crystals of terpene hydroxy ether, said hydroxylated terpene ethers being prepared by the method defined in claim 1 with ethyl alcohol as the alcohol.

10. Water-soluble hydroxylated phenyl terpene ethers formed by reaction of terpinolene with oxygen and phenol, the ethers being characterized by at least one tertiary terpene hydroxyl, by the property of losing hydroxyl on heating with sulfuric acid, and by being capable of concentration to a syrup which upon standing deposits colorless crystals of terpene hydroxy ether, said hydroxylated terpene ethers being prepared by the method defined in claim 1 with phenol as the alcohol.

JOSEPH N. BORGLIN.